Oct. 30, 1956    E. G. PERRY, JR., ET AL    2,769,142
ELECTRICAL RECORDER MOVEMENTS
Filed Sept. 28, 1951    2 Sheets-Sheet 1

INVENTORS
Edward Gordon Perry Jr., and
Robert W. Olson
BY Stevens, Davis, Miller & Mosher
ATTORNEYS

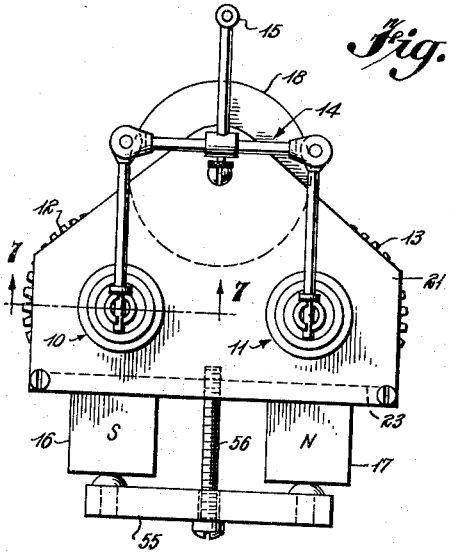
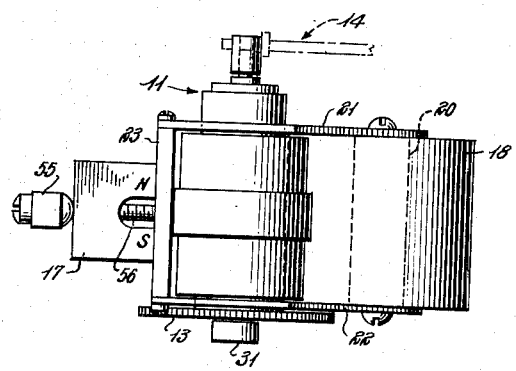
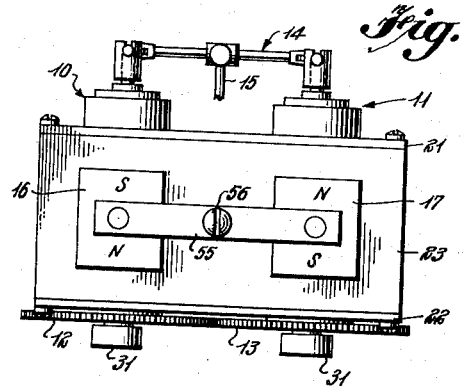
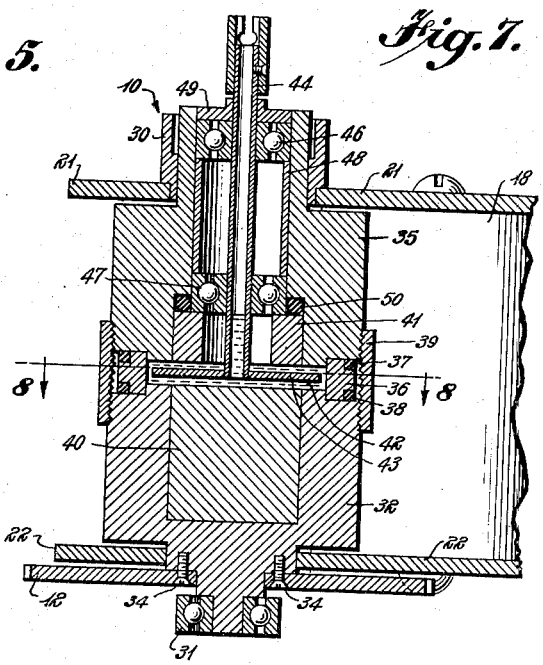
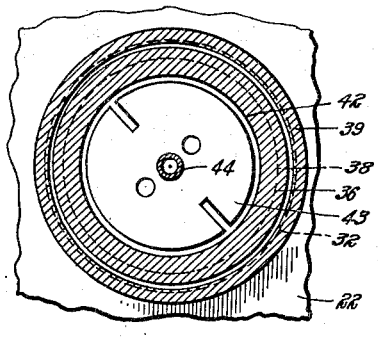

United States Patent Office 2,769,142
Patented Oct. 30, 1956

2,769,142

ELECTRICAL RECORDER MOVEMENTS

Edward Gordon Perry, Jr., and Robert W. Olson, Dallas, Tex., assignors to Texas Instruments Incorporated, a corporation of Delaware Application September 28, 1951, Serial No. 248,732

5 Claims. (Cl. 324—76)

This invention relates primarily to electrical recorder movements, but it is not limited thereto since its principles and the apparatus to be described are usable generally in electrical meters, electrical controls and other analogous devices.

Specifically, this invention relates to an electrical recorder movement utilizing a pair of opposed magnetic particle clutches in push-pull relationship. Such a recorder movement has been shown and described in application Serial Number 130,413, filed December 1, 1949, now Patent No. 2,651,754, of which this application is a continuation-in-part. This application is directed to certain improvements in the apparatus described therein.

The main improvements involved in this application may be briefly stated as (1) the avoidance of the use of slip rings to conduct electrical currents to rotating parts; (2) the use of a single operating coil to actuate two magnetic clutches; (3) the use of magnetic particles by themselves as distinguished from magnetic particles suspended in a liquid, as the clutch medium.

The present invention, as did the invention of the application of which this application is a continuation, has to do with a system in which the clutches act in push-pull relation, as distinguished from a system in which two clutches are connected to a push-pull electrical system and merely act in opposition. In the present system the push-pull effect is produced by the clutches themselves rather than by a supplemental electrical circuit.

There are several ways in which this can be done, all of them within the scope of this invention. Fundamentally, the only requirements are that each clutch be magnetically biased, and that magnetic flux be applied to each clutch to represent the current to be measured, and, lastly, but most importantly, that the relation between the biasing flux and the measurement flux be different in the two clutches. In other words, they should be aiding in one clutch and opposing in the other for any given direction of current to be measured.

Under the above circumstances, by properly setting the strength of the biasing flux, each of the clutches can be caused to operate on the most linear part of its curve and any lack of linearity that exists may be largely balanced out by the fact that it is of opposite direction in the opposed clutches.

Up to the time of the present invention, it was the practice to mount the magnet coil of the magnetic clutch in one of the two rotating elements. Since one of these elements was driven at constant speed by an outside source of power and the other element was adapted to change speed depending upon the coupling, it was the usual practice to mount the electromagnet coil in the constantly driven element so that the element that was to change speed would have as little inertia as possible. This was particularly desirable in an electrical recorder or meter movement.

In the application of which this application is a continuation-in-part the electromagnet coil is mounted in the clutch plate that is driven by an external source of power, and as can be seen from this application this construction necessitates the use of slip rings to convey the electrical current to be measured to the actuating coil. This has been found to cause difficulties and inaccuracies by reason of changing resistance in the slip ring construction.

The possibility of placing the electrical coil in the other clutch element has been considered, since the other clutch element does not rotate completely and the driving current could be connected to it through hair springs as it is in many ordinary meters and recorders, but such a construction has been found unsatisfactory because the operating coil adds considerable weight and inertia to the moving parts of the recorder movement and thus slows up the response to changes in current.

According to this invention, it has been discovered that the clutches and their attendant parts can be formed as a magnetic circuit with the operating coil in a stationary part of the construction and the magnetic circuit extending into and through both the externally driven part and the ultimately driven clutch part without any electrical connections to either of them. This is a major improvement in magnetic clutch construction, particularly those used in recorder or meter movements, because the rotation of the clutch parts causes no significant change in the magnetic flux passing through the clutch, whereas it does make signficant changes in the electrical currents flowing through a set of slip rings.

A further improvement effected by this invention is the utilization of a single magnetic operating coil to actuate two magnetic circuits both of which extend through the operating coil and one of which extends to each of the magnetic particle clutches.

As in the application of which this application is a continuation, each of the two magnetic particle clutches is magnetically biased to cause it to operate on the desired part of its operating curve, but in the construction of this application, it has been found possible to place these biasing magnets, as well as the operating coil, completely outside of the clutches themselves.

Still further advantages have been obtained in the present construction by the use of magnetic particles not suspended in any liquid, for it has been found that this practice reduces the residual drag in the clutches and increases their sensitivity.

Further, it is an object of this invention to provide an instrument of the above-mentioned nature which is easy to construct, simple in operation, very rugged, rapid in its response to changes in current and very accurate.

Further details and advantages of this invention will be apparent from the following detailed description of a preferred embodiment of the clutch as illustrated in the appended drawings.

With reference to the drawings:

Figure 4 is a top plan view of the preferred embodiment of this invention;

Figure 5 is an elevation of the embodiment shown in Figure 4;

Figure 6 is a side elevation of the embodiment shown in Figure 4;

Figure 7 is a view taken along the line 7—7 of Figure 4; and

Figure 8 is a view taken along the line 8—8 of Figure 7.

Figure 1:
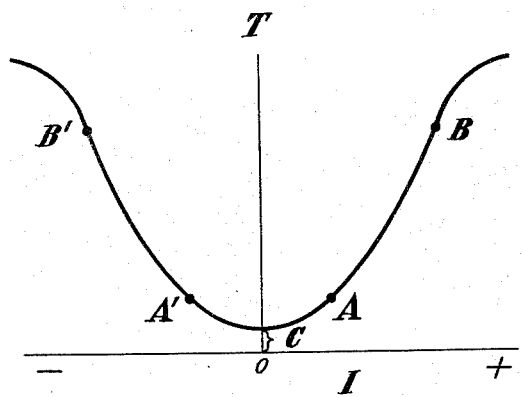
Figure 1 is a curve showing the relation between the torque and current in a single magnetic particle clutch.

With reference first to Figure 1 of the drawings, it can be seen that when the current increases in a positive direction, the slope of the torque-current curve increases from zero until it reaches a maximum value at point A. Thereafter it remains approximately a constant to point B. If the current is reversed, the slope of the curve increases to point A' and then remains approximately constant to point B', after which further increases of current produce little and finally no increase in torque.

Figure 2:
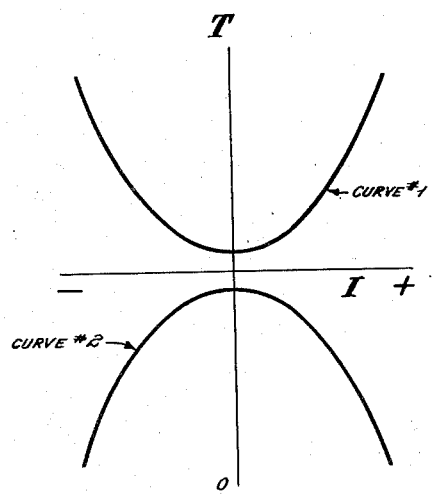
Figure 2 is a curve showing the relation between torque and current in two opposed magnetic particle clutches without any magnetic bias.

Referring to Figure 2 of the drawings, curve No. 1 represents the torque-to-current curve of one clutch and curve No. 2 represents the torque-current curve of a second clutch connected in opposition thereto. As these clutches are connected in opposittion and both receive the same operating current, the resultant torque is zero for every value of current since the resultant torque is the sum of the torques of the two clutches and they are always equal for equal currents.

Figure 3:
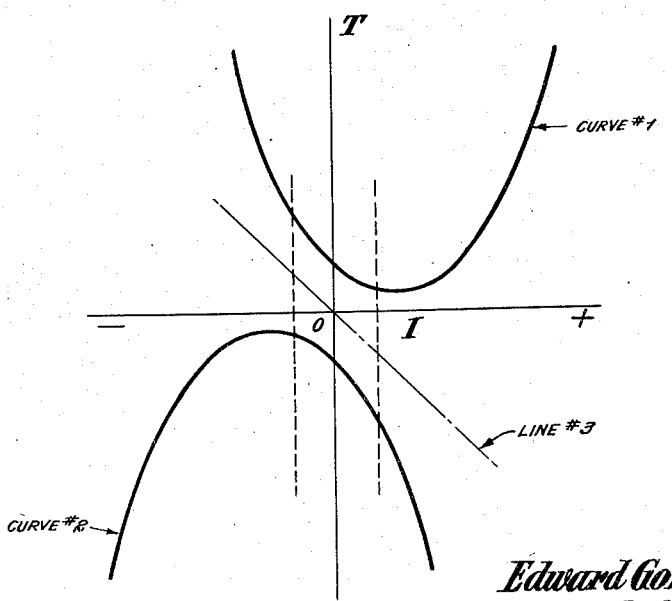
Figure 3 is similar to Figure 2 except that a magnetic bias has been provided for each of the clutches.

Referring to Figure 3, curve No. 1 represents the torque-current curve of one clutch with magnetic bias and curve No. 2 represents the torque-current curve of a second clutch connected in opposition thereto, also with magnetic bias. Either the bias or the operating coil acts in opposite directions on the two clutches. It can be seen from this figure that the torque developed by each clutch at zero current is somewhat more than the mere frictional or viscous drag of the clutch. This increase in torque is attributable to the magnetic bias.

The curves are still symmetrical but the minimum torque point on each is shifted, one in the positive direction and the other in the negative direction, due to the fact that they are opposed and that the magnetic bias or operating coil is arranged oppositely with respent to the two clutches. It can be seen from this that the resultant torque of the two falls along the center portion of line 3 in this figure. The torque-to-current characteristic, then, of the two opposing clutches with their magnetic bias is approximately a straight line, giving linearity of response over an extended range. For any increase in current in either direction there is a relatively constant increase of torque in the corresponding direction.

As indicated, this result may be achieved by any combination of operating flux and bias flux in which the two are opposed in one clutch when they are aiding in the other.

In the preferred embodiment illustrated in Figures 4 to 8, inclusive, the operating coil acts in the same direction on both clutches and the magnetic bias acts oppositely. The arrangement could be reversed so that the operating coil would act oppositely and the bias magnets would act in the same direction.

It is preferred to use one operating coil for this simplifies the construction and helps to keep the effects on the clutches balanced. However, a separate coil for each clutch can be used and they can be connected either in series or in parallel.

It is also preferred to rotate the clutches in opposite directions, but they can be rotated in the same direction and simply connected by the necessary levers or gears to make then oppose each other.

The preferred embodiment of the recorder movement of this invention is illustrated in Figures 4 to 8, inclusive. As there illustrated, it comprises basically, two magnetic particle clutch assemblies 10 and 11, driven in opposite directions through meshing gears 12 and 13, by a source of power not shown, and connected in opposition through a linkage 14 to operate a recorder pen or the like 15. The magnetic particle clutch assemblies 10 and 11 are biased respectively by permanent magnets 16 and 17 and are furnished with operating flux corresponding to the current to be measured by an operating coil 18.

The frame of the recorder movement consists of a core 20 extending through the operating coil 18, a top plate 21, a bottom plate 22 and a vertical connecting plate 23. These four parts are appropriately connected together by machine screws to form the frame of the meter movement. This is actually a sub-frame in the entire recorder assembly.

The core 20 and the top and bottom plates 21 and 22 are of highly permeable material so as to readily conduct the electromagnetic lines of force from the operating coil 18 to the top and bottom of the two magnetic particle clutch assemblies 10 and 11. The vertical connecting plate 23, however, is of magnetically transparent or non-permeable material so that it will not act as a shunt across the clutches.

The operating coil 18 of the clutch is mounted upon the core 20 and is arranged to have any suitable number of turns so as to produce the desired amount of flux without presenting undue resistance to the circuit into which it is connected. The upper frame plate 21 and the lower frame plate 22 are symmetrically shaped so as to conduct equal amounts of flux to the two magnetic clutches.

The detailed construction of the magnetic clutches is shown in Figures 7 and 8. It will be noted that although the main body of the magnetic clutch is arranged to rotate within openings in the recorder movement frame, bearings are provided for the main body of the clutch, which bearings are adapted to be received in appropriate members on the main frame of the recorder to support both the clutches and a recorder movement sub-frame. Thus, as can be seen in Figure 7 an upper solid bearing 30 and a lower ball bearing 31 are provided. By supporting these in appropriate members on the main frame of the recorder (not shown), the whole recorded movement assembly is supported.

At the top, the top recorder sub-frame plate 21 surrounds the lower end of a bearing 30 and at the bottom, the bearing 31 supports the lower half 32 of the body of the magnetic particle clutch and the lower recorder sub-frame plate 22 surrounds this lower body member at a point just above the place where the driving gear 12 is affixed to it by screws 34. This permits the clutch to be driven through the gear 12 from below the lower recorder movement frame plate 22.

The body of the magnetic particle clutch is completed by an upper body portion 35 that extends through and is journalled in the bearing 30. The two sections of the body are spaced apart by a spacer ring 36 of non-magnetic material and this spacer ring is provided with grooves to receive a pair of gaskets 37 and 38 which prevent the escape of material from the inside of the clutch body. The lower body portion 32 and the upper body portion 35 are held tightly against the spacer ring 36 and the sealing rings 37 and 38 by a non-magnetic retaining ring 39 which is threadedly connected to the lower end of the upper body member 35 and to the upper end of the lower body member 32.

Within the body members a small clutch cavity is formed and a magnetic path defined by filling the lower body member 32 with a non-permeable material 40 and by placing a non-permeable lining ring 41 in the upper clutch body 35. As a result, the clutch chamber 42 is defined and the magnetic flux is caused to flow through the body members 32 and 35 and the area near the periphery of the chamber 42 thus causing the changes in flux to have a maximum effect upon the operation of the clutch.

In the clutch chamber 42, there is positioned a small, light weight clutch disc 43 mounted upon the lower end of a hollow shaft 44. This shaft extends out of the top end of the clutch where it is connected by suitable connections to the linkage 14 through which it is connected in opposition to the other clutch and through which it also drives the recorder pen or other mechanism generally indicated as 15.

The clutch plate 43 and supporting shaft 44 are supported in the clutch by being mounted in two sets of ball bearings 46 and 47. The outer races of these ball bearings are mounted in the upper clutch body 35 and are spaced apart by a spacer ring 48 and covered at the top by an annular cover plate 49. A gasket 50 placed just outside of the bottom set of ball bearings prevents clutch liquid or particles from passing between the bearing race and the upper body 35. Since the clutch plate supporting shaft 44 is hollow the magnetic particles or the magnetic particles suspended in liquid may be inserted therethrough to fill the clutch.

The biasing of the clutches is accomplished from outside of the clutches by a pair of U-shaped permanent magnets 16 and 17 which are held against the vertical spacer plate 23, one opposite each clutch, by a pressure bar 55 connected by a screw 56 to the vertical spacer plate 23. These magnets are oriented with respect to the clutches so as to bias them in the opposite directions.

Without any current flowing in the operating coil 18, the permanent magnets cause each of the clutches to transmit the same amount of force, when they are rotated at the same speed through the gears 12 and 13. Since they are connected in opposition there is no resultant movement of the linkage 14 and the recorder pen 15. When a current is passed through the operating coil 18, the force transmitted through one clutch is increased and that transmitted through the other clutch is decreased, depending upon the direction of the current. As a consequence, the forces applied to the linkage 14 are unbalanced and the linkage and the recording pen move in one direction or the other depending upon the direction in which the current is applied. This movement will continue until the current through the operating coil ceases or until the difference in forces is balanced, for example, by a spring (not shown) arranged to resist the movement of the linkage 14.

As is well known, there are meters and recorders in which the movement works against a spring and there are others, particularly instruments that work on the null principle, where the movement does not work against a spring but where the movement adjusts the position of some control that in turn balances the current through the control coil thus nulling the system and stopping the movement. The present type of movement may be used in either type or system and therefore the linkage 14 may be restrained by a spring in its movement or may be allowed to move freely and arranged to control a nulling system. The movement of this invention may also be allowed to move freely so that it will record current integrated with time rather than merely current.

What is claimed is:

1. An electrical meter for measuring current that comprises two opposed magnetic particle clutches with their driven faces mechanically coupled together in push-pull arrangement, a single coil to carry the current to be measured and to supply magnetic flux proportional to said current to both clutches, a source of magnetic bias flux to aid the flux produced by said current in one clutch and to subtract from it in the other and a means associated with said push-pull coupling to indicate a measurement of said current.

2. An electrical meter for measuring current that comprises two opposed magnetic particle clutches with their driven faces mechanically coupled together in push-pull arrangement, a single coil to carry the current to be measured and to supply magnetic flux proportional to said current to both clutches in parallel, a source of magnetic bias flux to aid the flux produced by said current in one clutch and to subtract from it in the other and a means associated with said push-pull coupling to indicate a measurement of said current.

3. An electrical meter for measuring current that comprises two opposed magnetic particle clutches with their driven faces mechanically coupled together in push-pull arrangement, a single coil to carry the current to be measured and to supply magnetic flux proportional to said current to both clutches in parallel, two permanent magnets, one associated with each of said clutches to produce magnetic biasing flux therein, both of said magnets being arranged opposite in polarity with respect to each other so as to aid the flux produced by said current in one clutch and to subtract from it in the other and a means associated with said push-pull coupling to indicate a measurement of said current.

4. An electrical recorder movement that comprises two magnetic particle clutches, each including an outer driving member and an inner driven member, means for rotating the outer driving members at constant speed, means connecting the inner driven members in opposition and also connected to operate a recorder stylus, means external to the clutches for generating magnetic flux proportional to a current to be recorded, means cooperating with the outer driving members of the clutches to conduct the said magnetic flux equally through said clutches, each of said outer driving members defining a clutch chamber around said inner clutch member and also defining a low reluctance flux path to and from said chamber, and means for applying a bias magnetic flux to each of said clutches, said bias flux being applied oppositely with respect to the operating flux in the two clutches.

5. An electrical meter for measuring current that comprises two opposed magnetic particle clutches with their driven faces mechanically coupled together in push-pull arrangement, a single means to generate magnetic flux proportional to the current to be measured and to apply said flux to both of said opposed magnetic particle clutches, means to apply constant bias flux to each of said magnetic particle clutches, said last-mentioned means being arranged to apply bias flux to aid the operating flux in one clutch when it opposes the operating flux in the other clutch and means associated with said push-pull coupling, the movement of which is an indication of said current.

References Cited in the file of this patent

UNITED STATES PATENTS

| | | |
|---|---|---|
| 1,303,484 | Davies | May 13, 1919 |
| 1,684,243 | Rich | Sept. 11, 1928 |

OTHER REFERENCES

Publication I—"The Magnetic Fluid Clutch," by Jacob Rabinow. AIEE Paper 48–238 made available for printing Sept. 3, 1948. Copy available in Patent Office Division 68.

Publication II—"Further Development of the NBS Magnetic Fluid Clutch," National Bureau of Standards Technical News Bulletin. Volume 34, Number 12. December 1950. Copy available in Patent Office Division 68.

Publication III—"Characteristics of Some Magnetic Fluid Clutch Servomechanisms," AIEE Technical Paper 50–24. By Parziale and Tilton. Available Dec. 6, 1949. Copy available in Patent Office Division 68.